(12) United States Patent
Kumar et al.

(10) Patent No.: US 10,621,097 B2
(45) Date of Patent: Apr. 14, 2020

(54) APPLICATION AND PROCESSOR GUIDED MEMORY PREFETCHING

(71) Applicant: Intel Corporation, Santa Clara, CA (US)

(72) Inventors: Karthik Kumar, Chandler, AZ (US); Thomas Willhalm, Sandhausen (DE); Patrick Lu, Chandler, AZ (US); Francesc Guim Bernat, Barcelona (ES); Shrikant M. Shah, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 15/640,283

(22) Filed: Jun. 30, 2017

(65) Prior Publication Data

US 2019/0004954 A1 Jan. 3, 2019

(51) Int. Cl.
| | | |
|---|---|---|
| *G06F 12/00* | (2006.01) | |
| *G06F 13/00* | (2006.01) | |
| *G06F 12/0862* | (2016.01) | |
| *G06F 12/02* | (2006.01) | |
| *G06F 12/0866* | (2016.01) | |

(52) U.S. Cl.
CPC ...... *G06F 12/0862* (2013.01); *G06F 12/0238* (2013.01); *G06F 12/0246* (2013.01); *G06F 12/0866* (2013.01); *G06F 2212/202* (2013.01); *G06F 2212/214* (2013.01); *G06F 2212/221* (2013.01); *G06F 2212/602* (2013.01); *G06F 2212/7202* (2013.01)

(58) Field of Classification Search
CPC ............. G06F 12/0862; G06F 12/0238; G06F 2212/202; G06F 2212/602
USPC .................................................. 711/137, 204
See application file for complete search history.

(56) References Cited

U.S. PATENT DOCUMENTS

| | | | | |
|---|---|---|---|---|
| 7,533,242 | B1 * | 5/2009 | Moll .................... | G06F 12/0862 711/213 |
| 8,381,213 | B1 * | 2/2013 | Naamad .............. | G06F 12/0862 718/100 |
| 2014/0101389 | A1 * | 4/2014 | Nellans ............... | G06F 12/0862 711/137 |
| 2016/0378667 | A1 * | 12/2016 | Roberts ............... | G06F 12/0862 711/119 |
| 2017/0083474 | A1 * | 3/2017 | Meswani ............ | G06F 13/4234 |
| 2017/0177364 | A1 * | 6/2017 | Ould-Ahmed-Vall ....................... G06F 9/30043 |

* cited by examiner

*Primary Examiner* — Sean D Rossiter
(74) *Attorney, Agent, or Firm* — Thorpe North & Western, LLP

(57) ABSTRACT

Devices and systems having memory-side adaptive prefetch decision-making, including associated methods, are disclosed and described. Adaptive information can be provided to memory-side controller and prefetch components that allow such memory-side components to prefetch data in a manner that is adaptive with respect to a particular read memory request or to a thread performing read memory requests.

26 Claims, 8 Drawing Sheets

APPLICATION AND PROCESSOR GUIDED MEMORY PREFETCHING

BACKGROUND

Computer systems operate by executing instruction sequences that form a computer program. These instructions sequences are stored in a memory subsystem, along with any data operated on by the instructions, both of which are retrieved as necessary by a processor, such as a central processing unit. The speed of CPUs has increased at a much faster rate compared to the memory subsystems upon which they rely for data and instruction code, and as such, memory subsystems can be a significant performance bottleneck. While one solution to this bottleneck would be to primarily use in a computer system only very fast memory, such as static random-access memory, the cost of such memory would be prohibitive. In order to balance cost with system performance, memory subsystem architecture is typically organized in a hierarchical structure, with faster expensive memory operating near the processor at the top, slower less expensive memory operating as storage memory at the bottom, and memory having an intermediate speed and cost, operating in the middle of the memory hierarchy.

Further techniques can be implemented in order to further improve the efficiency of a memory hierarchy. For example, cache buffering of data between memory levels can reduce the frequency that lower speed memory is accessed. In another example, parallel access channels can be used, both within and in between memory levels, to perform data operations in parallel.

DESCRIPTION OF EMBODIMENTS

Figure 1A:
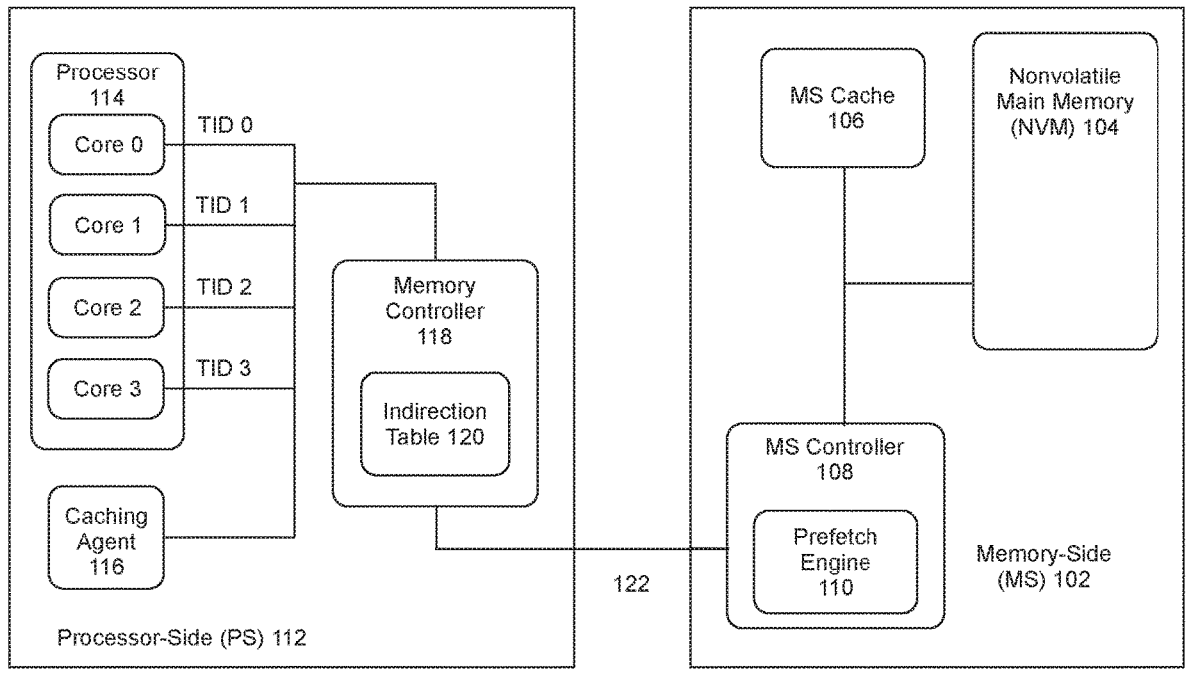
FIG. 1A illustrates a block diagram of a memory subsystem in accordance with an example embodiment.

Although the following detailed description contains many specifics for the purpose of illustration, a person of ordinary skill in the art will appreciate that many variations and alterations to the following details can be made and are considered included herein. Accordingly, the following embodiments are set forth without any loss of generality to, and without imposing limitations upon, any claims set forth. It is also to be understood that the terminology used herein is for describing particular embodiments only, and is not intended to be limiting. Unless defined otherwise, all technical and scientific terms used herein have the same meaning as commonly understood by one of ordinary skill in the art to which this disclosure belongs. Also, the same reference numerals in appearing in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various embodiments. One skilled in the relevant art will recognize, however, that such detailed embodiments do not limit the overall concepts articulated herein, but are merely representative thereof. One skilled in the relevant art will also recognize that the technology can be practiced without one or more of the specific details, or with other methods, components, layouts, etc. In other instances, well-known structures, materials, or operations may not be shown or described in detail to avoid obscuring aspects of the disclosure.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open-ended term in this written description, like "comprising" or "including," it is understood that direct support should be afforded also to "consisting essentially of" language as well as "consisting of" language as if stated explicitly and vice versa.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of"

an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of phrases including "an example" or "an embodiment" in various places throughout this specification are not necessarily all referring to the same example or embodiment.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

An initial overview of embodiments is provided below and specific embodiments are then described in further detail. This initial summary is intended to aid readers in understanding the disclosure more quickly, but is not intended to identify key or essential technological features, nor is it intended to limit the scope of the claimed subject matter.

New and evolving memory technologies allow the use of nonvolatile memory (NVM) in roles that extend beyond traditional memory storage. NVM is a persistent storage medium, or in other words, a storage medium that does not require power to maintain the state of data stored therein. Nonlimiting examples of NVM can include planar or three-dimensional (3D) NAND flash memory, including single or multi-threshold-level NAND flash memory, NOR flash memory, single or multi-level Phase Change Memory (PCM), such as chalcogenide glass PCM, planar or 3D PCM, cross-point array memory, including 3D cross-point memory, non-volatile dual in-line memory module (NVDIMM)-based memory, such as flash-based (NVDIMM-F) memory, flash/DRAM-based (NVDIMM-N) memory, persistent memory-based (NVDIMM-P) memory, 3D cross-point-based NVDIMM memory, resistive RAM (ReRAM), including metal-oxide- or oxygen vacancy-based ReRAM, such as $HfO_2$—, $Hf/HfO_x$—, $Ti/HfO_2$—, $TiO_x$—, and $TaO_x$-based ReRAM, filament-based ReRAM, such as $Ag/GeS_2$—, $ZrTe/Al_2O_3$—, and Ag-based ReRAM, programmable metallization cell (PMC) memory, such as conductive-bridging RAM (CBRAM), silicon-oxide-nitride-oxide-silicon (SONOS) memory, ferroelectric RAM (FeRAM), ferroelectric transistor RAM (Fe-TRAM), anti-ferroelectric memory, polymer memory (e.g., ferroelectric polymer memory), magnetoresistive RAM (MRAM), write-in-place non-volatile MRAM (NVMRAM), spin-transfer torque (STT) memory, spin-orbit torque (SOT) memory, nanowire memory, electrically erasable programmable read-only memory (EEPROM), nanotube RAM (NRAM), other memristor- and thyristor-based memory, spintronic magnetic junction-based memory, magnetic tunneling junction (MTJ)-based memory, domain wall (DW)-based memory, and the like, including combinations thereof. The term "memory device" can refer to the die itself and/or to a packaged memory product. NVM can be byte or block addressable. In some examples, NVM can comply with one or more standards promulgated by the Joint Electron Device Engineering Council (JEDEC), such as JESD21-C, JESD218, JESD219, JESD220-1, JESD223B, JESD223-1, or other suitable standard (the JEDEC standards cited herein are available at www.jedec.org). In one specific example, the NVM can be 3D cross-point memory. A memory or memory device can thus include future generation NVM and devices, such as 3D cross-point memory, for example, or other byte addressable write-in-place NVM.

One example of such a role is the use of NVM as main or system memory. Nonvolatile main memory (referred to herein as NVM, unless the context clearly indicates otherwise) has many advantages, such as high density, large capacity, and reduced manufacturing complexity, to name a few. Byte-addressable, write-in-place NVM such as 3D cross-point memory, for example, can operate similar to dynamic RAM (DRAM) (byte-addressable) or as NAND (block-addressable), or in other words, NVM can operate as main memory or as persistent NVM for storage. In situations where NVM is functioning as main memory, stored data is generally discarded or otherwise rendered unreadable when power to the NVM is interrupted. Further examples of NVM are described below.

While NVM can be highly advantageous, memory access latencies tend to be relatively high, which can limit system performance. One technique for reducing memory access latency overhead associated with NVM involves caching and prefetching data memory-side (MS) in a volatile memory cache that has a lower access latency, thus effectively reducing the memory access latency overhead. As such, when data is retrieved from the NVM in response to a memory access request, other associated data that may be subsequently requested can be retrieved from the lower-latency MS cache. Assume, as an example, a NVM on a dual in-line memory module (DIMM) having a MS cache for storing prefetched data having a 64 Byte (B) cache line size, and four NVM banks (JESD21-C, MODULE4.20.29, for example). For each 64B chunk of data referenced by a memory access request, 256B of data are retrieved; the 64B chunk from one NVM bank to fill the memory access request, and three 64B chunks from the other three NVM banks that are on the same command/address bus. This extra "prefetched data" can be stored in the MS cache under the general assumption of spatial locality, and thus be used to fill a subsequent memory access request at a lower memory access latency.

One caveat with such a MS prefetch scheme involves the lack of awareness of the nature and/or origin of different access requests (or references), such as, for example, the inability to discern the difference between references coming from different hardware threads or the relevance of prefetched data to a given hardware thread. One reason for this relates to MS caches being tied to a lower memory tier from which data is being retrieved. The MS prefetchers (or controllers) have no context as to the origins of incoming memory access requests, and merely cache all prefetch data coming from the lower memory tier with equal priority. This is in contrast to a processor-side (PS) prefetcher and cache that are tied to the compute tier, or in other words, the processor or processor core in which the PS prefetcher and cache are integrated. Because the PS cache is linked to the originator of the memory access requests, all such requests can be cached according to origin, irrespective of the memory destination of any given memory access request. Furthermore, PS prefetchers have information related to memory access streams (i.e., the collection of hardware threads accessing memory), such as instructions pointers, how memory access code is executing, what patterns of memory access are occurring, and the like. Such PS prefetchers, therefore, have access to more information regarding the nature and origin of memory access requests, which allows PS prefetching components to make more adaptive "intelligent" caching decisions, and thus prefetch requests can be issued that are relevant to each specific memory access task. Because this information is not extended to the MS, MS prefetchers retrieve and cache prefetch data irrespective of the processor, the processor core, or the hardware thread.

Because traditional MS prefetchers and caches are blind to the specific source and nature of a given memory access request, all memory accesses are treated with equal priority. As a result, a thread executing random accesses having little to no spatial locality (and thus a low likelihood of a subsequent hit on prefetch data), uses the same amount of MS cache space as a thread with sequential/localized accesses having a high spatial locality (and thus a high likelihood of a subsequent hit on prefetch data). The same is true for a thread with even lower priority, such as a garbage collection thread, for example. There would be no spatial locality for data referenced by such a thread, and associated prefetched data would merely be wasting entries in the MS cache.

The present disclosure addresses this problem by providing sufficient information or "awareness" to MS prefetchers, controllers, cache, and/or the like, to allow these MS components to make adaptive caching decisions that are more relevant to the contents of the MS cache, the MS cache content history, the specific details of each memory access request, patterns of memory access requests, and/or the like. Such caching decisions can include any decision that effects the caching of data, including prefetching, cache population, cache eviction, cache prioritization, and the like. The type and amount of information provided to the MS components can vary according to system architecture, system operating specifications, and the like, and can include any type of information capable of being used by the MS components to make caching decisions that decrease memory access latency overhead. Such information can be referred to as "adaptive information," because the information allows the MS components to appropriately adapt prefetch/cache behavior to each memory access request.

FIG. 1A shows an example embodiment of a computing system including MS 102 and PS 112. MS 102 can be a physically separable from PS 112, such as, for example, a DIMM or other memory card configuration, integrated into a system board such as a motherboard, located on a processor package, or the like. As such, "MS" refers to components of the system memory, and does not necessarily refer to a specific or distinct physical location. With this in mind, MS 102 can include NVM 104 communicatively coupled to MS cache 106, which is operable for caching at least prefetch data to improve memory access latency overhead. In addition to prefetch data, MS cache 106 can cache non-prefetched data, such as, for example, read data that has been retrieved to fill a read request, and which may or may not be associated with prefetch data present, or being retrieved into, MS cache 106. MS cache 106 can include any type of memory, including volatile and NVM, that is capable of reducing memory latency access overhead by caching NVM data and prefetch data. In one example, MS cache memory can be volatile memory (see below for examples of volatile memory). MS controller 108 is communicatively coupled to NVM 104 and to MS cache 106, and is configured to at least manage cache operations. MS controller 108 can include prefetch engine 110, which can include hardware circuitry, logic, and the like, to facilitate prefetch decisions and/or prefetch operations, either alone or in combination with MS controller 108. In one example, such decision/operation can include retrieving read data by MS controller 108 from a memory address in the NVM to fill a received read request, retrieving prefetch data having an adaptive correlation to the read request, and storing the prefetch data in MS cache 106. It is noted that reference to "MS controller" can refer to the functionality of a prefetch engine, and vice versa, and that reference to either term is considered to include both, unless the context clearly indicates otherwise.

Figure 1B:
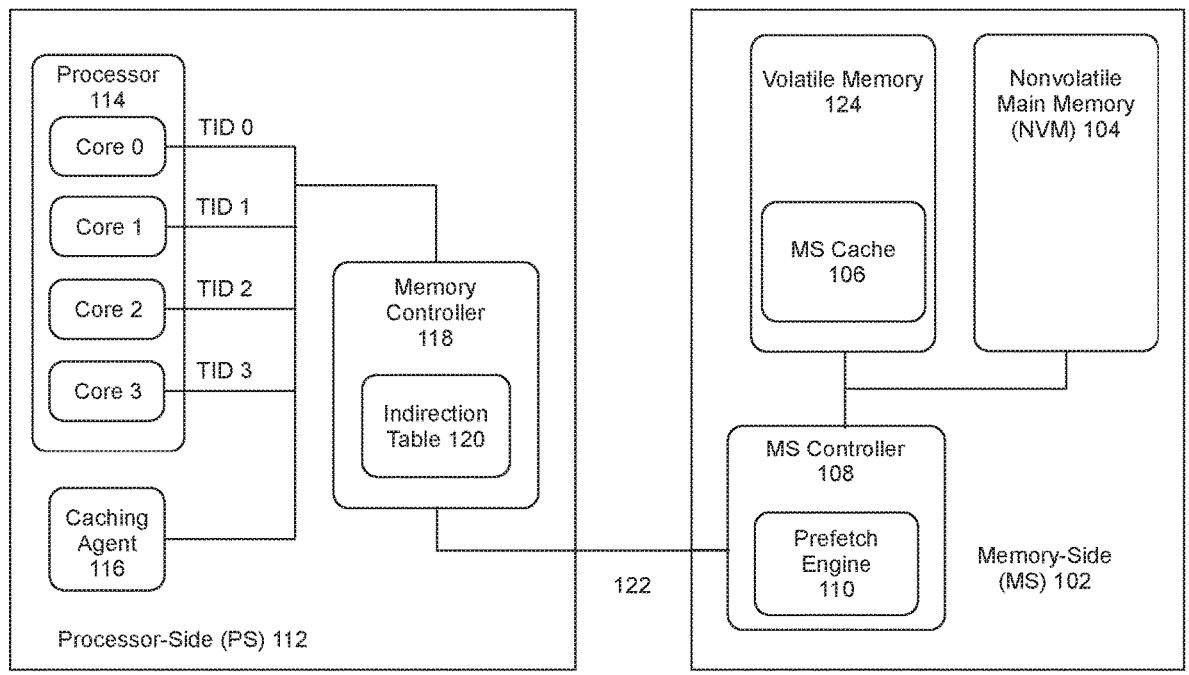
FIG. 1B illustrates a block diagram of a memory subsystem in accordance with an example embodiment.
Figure 1C:
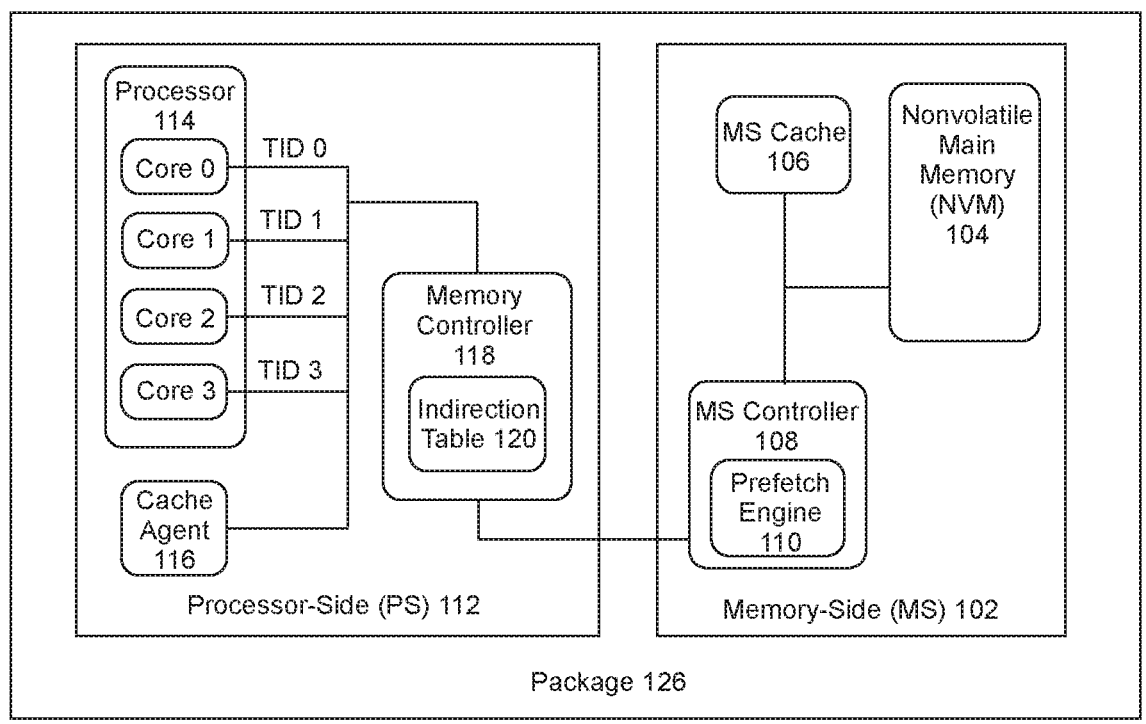
FIG. 1C illustrates a block diagram of a memory subsystem in accordance with an example embodiment.

MS controller 108 can be a dedicated cache and prefetch controller in some examples, and can perform other memory-related controller tasks in other examples. Additionally, prefetch engine 110 can be a distinct hardware structure within or communicatively coupled to MS controller 108, an integrated subcomponent or circuit within, or a functionality of, MS controller 108. FIG. 1B shows an example that further includes volatile memory 124 communicatively coupled to MS controller 110 and to NVM 104. In this example, MS cache 106 resides in a portion of volatile memory 124. Volatile memory 124 can be used for any memory-related function, including system memory in conjunction with NVM 104, caching or buffering operations other than prefetch data, or the like. FIG. 1C shows an example where PS 112 and MS 102 are located on a common package 126. Additionally, packages having multiple MS 102 regions are contemplated (not shown).

As shown in the examples of FIGS. 1A, B, and C, PS 112 can include processor 114, which can be a single processor or multiple processors, including single core processors and multi-core processors. Processor 114 can also include any processor type or configuration, nonlimiting examples of which can include microprocessors, embedded processors, central processing units (CPUs), digital signal processors (DSPs), field programmable gate arrays (FPGAs), network processors, hand-held or mobile processors, application-specific processors, co-processors, and the like. Processor 114 can be packaged in numerous configurations, which is not limiting. For example, processor 114 can be packaged in a common processor package, a multi-core processor package, a system-on-chip (SoC), a system-in-package (SiP), a system-on-package (SOP), and the like. FIG. 1A shows processor 114 as having 4 cores (Cores 0-3); however, a processor or processors can include any number of cores, which is not limiting. The processor cores can generate a number of hardware threads, each having a thread identifier (TID). The cores of processor 114 are communicatively coupled to cache agent 116 and to memory controller 118, which can further include indirection table 120. Memory controller 118 can be integrated on chip or on package with processor 114, within an uncore portion of a processor package, or in a structure or component separate from the processor package, such as, for example, an input/output (I/O) hub, Northbridge, or the like. Memory controller 118 is communicatively coupled to MS controller 108 on the MS 102 by interface 122, which can include any appropriate communication interface. Non-limiting examples can include peripheral component interconnect express (PCIe), Intel® QuickPath Interconnect (available from Intel Corporation, Santa Clara, Calif.), in-package interconnect, in-die interconnect, Intel® on-chip system fabric (IOSF), fabrics, direct media interface (DMI), embedded multi-die interconnect, and the like.

Various implementations are considered that facilitate adaptive decision-making in MS components to more effectively select and cache data, including prefetch data. Generally, information relating to memory access is provided by the PS to the MS, which allows MS cache and prefetch components to make adaptive prefetch decisions, and to maintain entries in the MS cache that are prioritized according to a likelihood of subsequent retrieval. Such information can relate to a particular read access request for a chunk of read data (i.e., data that is referenced by the read access request) that provides some indication or "hint" as to other data that may be correlated with the chunk of read data and/or the read access request. For example, the PS can provide the MS with the identity of the hardware thread (TID, also referred to the ID of a logical core), which allows the MS to make prefetch decisions based on the data that the thread associated with the TID is expected to fetch. For example, knowing that the thread is a maintenance or random-access thread, the MS controller will not issue prefetch commands, and any prefetch data that is retrieved along with the data being read by the thread can be discarded. On the other hand, knowing that the thread is performing sequential reads, striding reads, or any other read pattern where locations of related data are known, the MS controller is made aware of data that will be subsequently retrieved. As a result, the MS controller can issue prefetch commands to retrieve such related data into the MS cache, thereby reducing memory access latency.

In addition to TID, a prefetch hint can also be sent to the MS controller to provide further information that can be used in making even more informed adaptive prefetch decisions. For example, a prefetch hint can include various details pertaining to the memory access behavior of the thread, such as the type of memory read pattern, the type of offset, specific offset details, the type of coherency state (e.g., shared line, exclusive line, and the like), final cache hierarchy on the PS (Level 1, Level 2, Level 3 cache, etc.), snoop timing, and the like. Additionally, information from various PS components can be incorporated into a prefetch hint, or otherwise used as a prefetch hint. For example, cache agent 116 includes a list of upcoming read requests, which can be provided to MS controller 108 to further facilitate the adaptive prefetch decision process. Knowing which data is likely to be subsequently retrieved allows the MS controller to prefetch this data prior to receiving the data request from the thread.

The TID and/or the prefetch hint can be provided to the MS controller in a variety of ways, and can include virtually any technique for communicating between the PS and the MS. For example, such information can be sent to the MS controller as part of a read request. One technique can include using unused bits in, or adding additional bits to, a read request to convey the information. Thus, a particular bit setting can specify memory read pattern, offset type, offset details, and the like. As specific examples, a first bit setting may specify that the thread is performing stride operation with a fixed offset, a second bit setting may specify that the thread is performing stride operation with an offset of 128 bytes, a third bit setting may specify that the thread is performing random access operations, etc.

Figure 2:
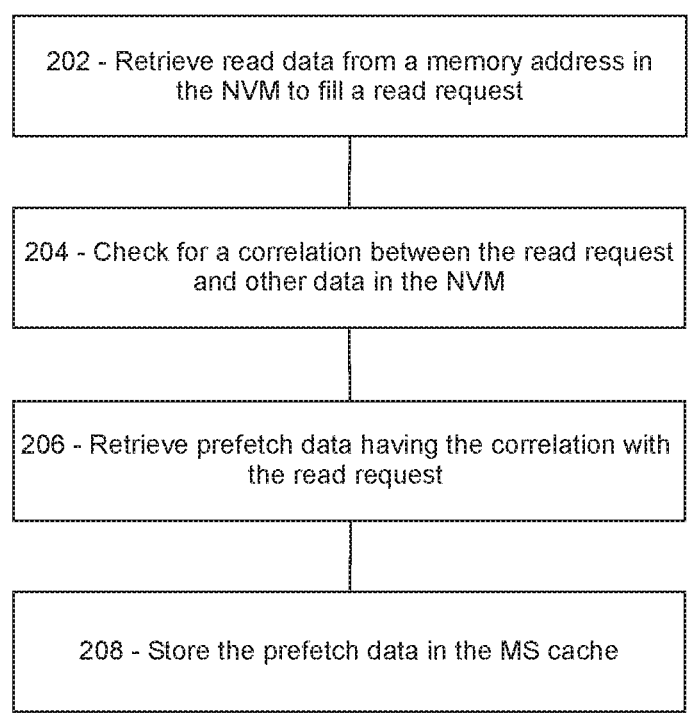
FIG. 2 illustrates steps performed by circuitry of a memory-side controller in accordance with an example embodiment.

Referencing FIGS. 1A-C, a MS device can include MS controller 108 including prefetch engine 110, communicatively coupled to MS cache 106 and NVM 104. MS cache 106 is operable to store a cached subset of the NVM 104, including read data and prefetch data. MS controller 108 can include circuitry that is configured to, as is shown in FIG. 2, 202 retrieve read data from a memory address in NVM 104 to fill a read request, 204 check for a correlation between the read request and other data in NVM 104, 206 retrieve prefetch data having the correlation with the read request, and 208 store the prefetch data in MS cache 106. By checking for such correlations, MS controller 108 can make appropriate prefetch decisions that are adaptive to each memory access request. In this manner, MS controller 108 prefetches data that has a defined correlation with the read request, or with the read data of the read request. If such a correlation does not exist for a given read request, MS controller 108 does not issue prefetch commands, and can discard any prefetch data that is retrieved with the read data.

Various techniques are contemplated for checking for a correlation between the read request and other data in NVM 104. In one example, MS controller 108 circuitry and/or prefetch engine 110 (collectively MS controller 108) can be configured to determine a prefetch pattern from adaptive information received from PS 112. Upon identification of a prefetch pattern, MS controller 108 identifies prefetch data from the prefetch pattern, which can be retrieved from NVM 104 and sent to MS cache 106. The adaptive information can include any information useful to MS controller 108 in determining prefetch patterns, prefetch data, and the like. In some examples, the adaptive information can include a TID. In other examples, the adaptive information can include a TID and a prefetch hint. A prefetch hint can include any information that can assist MS controller 108 in making adaptive prefetch decisions. In addition to the prefetch hint details described above, in one example the prefetch hint can include a function that correlates the prefetch data with the read data, the memory address, or both. For example, a prefetch hint may indicate that a thread is performing striding read operations, along with a function that describes the specific pattern of striding correlated to the physical memory addresses were the associated data is located.

In another example, the prefetch hint can include a priority indicator to provide to MS controller 108 a relative priority of the read data and/or related prefetch data. The priority indicator, as well as any other prefetch hint detail, can be stored in MS cache 106. This allows MS controller 108 to prioritize, not only data to be prefetched, but also the cache lines in MS cache 106. In this case, the priority indicator can be associated with the prefetch and read data and used to create and maintain a priority hierarchy in MS cache 106. Such a priority hierarchy can assist MS controller 108 in maintaining a cache population that is at least partially based on this priority, thus facilitating more effective cache eviction results. By maintaining a population of cache lines that is based at least partially on such a priority, read requests for data associated with a prior read request that has a high priority or importance has a greater chance of being maintained in MS cache 106. In one example, MS controller 108, upon identifying prefetch or read data to cache, is configured to identify a full state of MS cache 106, or in other words, to determine that MS cache 106 has insufficient empty space for caching the data. In such cases, MS controller 108 can make a determination as to whether or not the prefetch data has a higher priority compared to at least a portion of the cache lines stored in MS cache 106, and subsequently evict lower priority cache lines to free up cache space to store the prefetch or read data having the higher priority.

Figure 3:
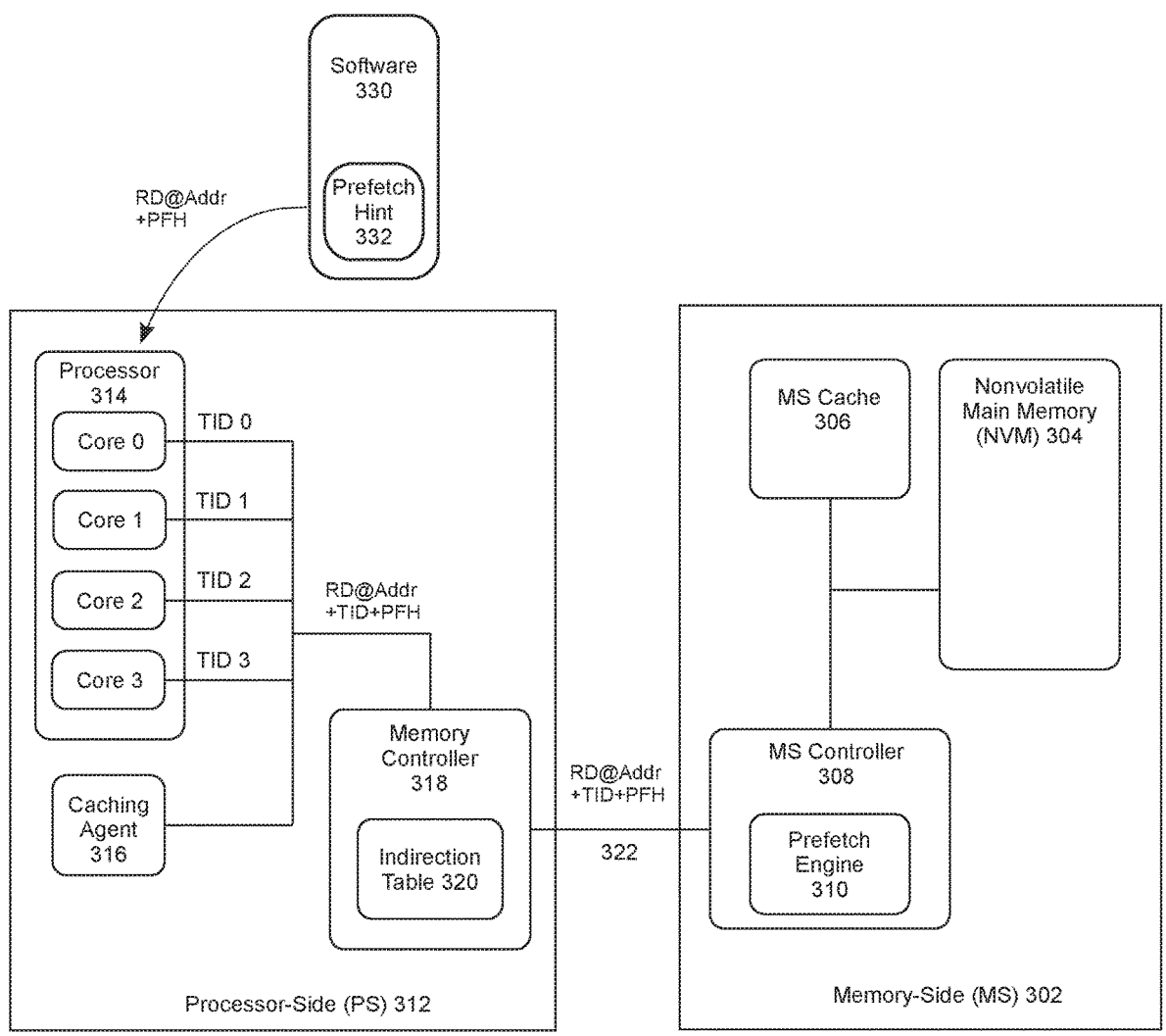
FIG. 3 illustrates a block diagram of a computing system in accordance with an example embodiment.
Figure 4:
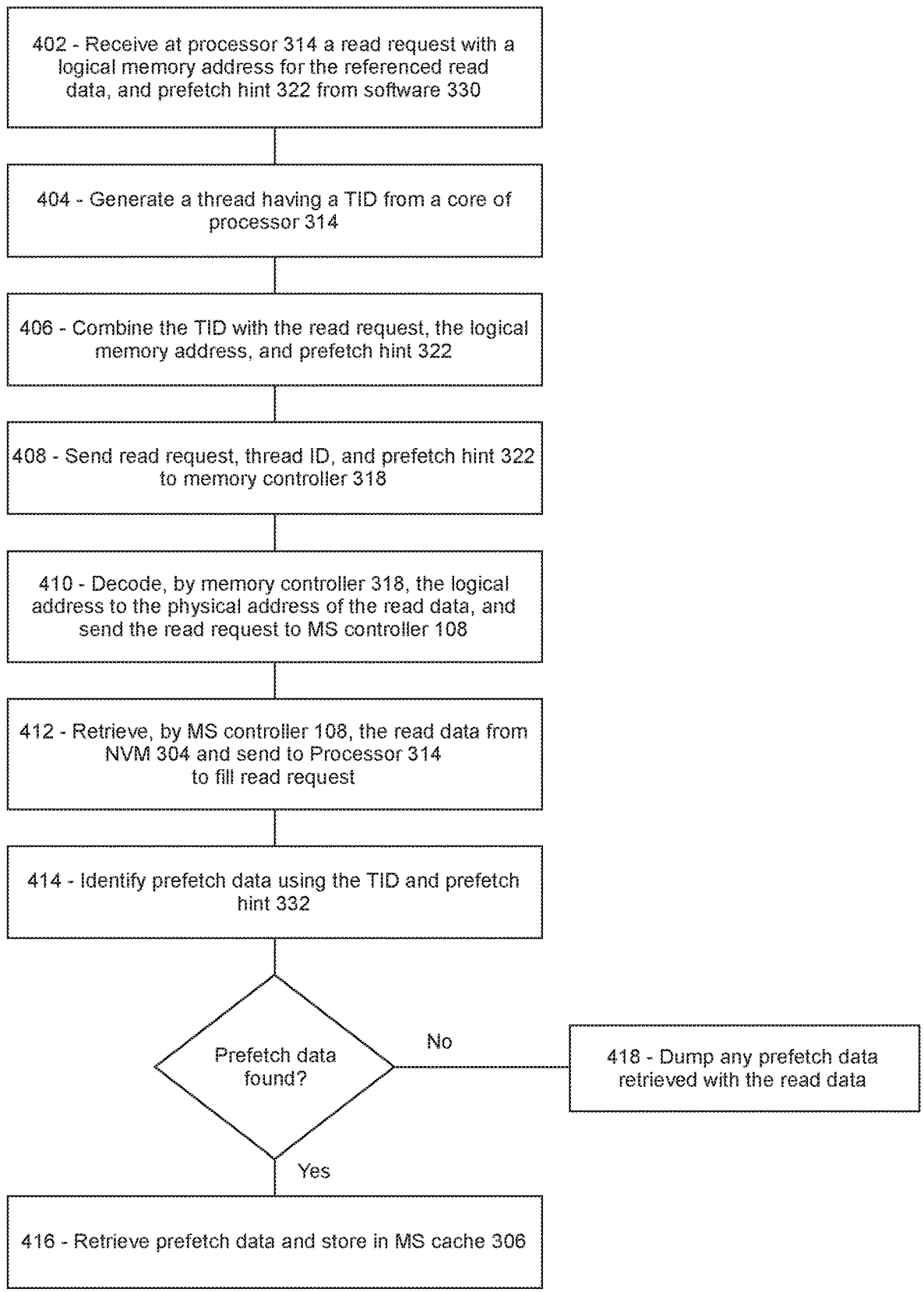
FIG. 4 illustrates steps performed by components of a computing system in accordance with an example embodiment.

In another example, as shown in FIGS. 3 and 4, a computing system includes MS 302 and PS 312. As similarly described above in FIG. 1A, MS 302 can include NVM 304 communicatively coupled to MS cache 306, which is operable for caching at least prefetch data to improve memory access latency overhead. In addition to prefetch data, MS cache 306 can cache non-prefetched data, such as, for example, read data that has been retrieved to fill a read request, and which may or may not be associated with prefetch data present, or being retrieved into, MS cache 306. MS cache 306 can include any type of memory, including volatile and NVM, that is capable of reducing memory latency access overhead by caching NVM data and prefetch data. In one example, MS cache memory can be volatile memory, described more fully below. MS controller 308 is communicatively coupled to NVM 304 and to MS cache 306, and is configured to at least manage cache operations. MS controller 308 can include prefetch engine 310, which can include hardware circuitry, logic, and the like, to facilitate prefetch decisions and/or prefetch operations, either alone or in combination with MS controller 308. In one example, such decision/operation can include retrieving read data by MS controller 308 from a memory address in NVM 304 to fill a received read request, retrieving prefetch data having an adaptive correlation to the read request, and storing the prefetch data in MS cache 306. It is noted that reference to "MS controller" can refer to the functionality of a prefetch engine, and vice versa, and that reference to either term is considered to include both, unless the context clearly indicates otherwise.

PS 312 can include processor 314, which can be a single processor or multiple processors, including single core processors and multi-core processors. Processor 314 can include any processor type, configuration, or packaging, as described above. FIG. 3 shows processor 314 as having 4 cores (Cores 0-3); however, a processor or processors can include any number of cores, which is not limiting. The processor cores can generate a number of hardware threads, each having a TID. The cores of processor 314 are communicatively coupled to cache agent 316 and to memory controller 318, which can further include indirection table 320. Memory controller 318 can be integrated on chip or on package with processor 314, within an uncore portion of a processor package, or in a structure or component separate from the processor package, such as, for example, an input/output (I/O) hub, Northbridge, or the like. Memory controller 318 is communicatively coupled to MS controller 308 on the MS 302 by interface 322.

In one example implementation, shown in FIG. 4, 402 processor 314 receives a read request with an associated logical memory address for the data referenced by the read request (i.e., read data), and prefetch hint 322 from software 330, represented by RD@Addr+PFH (Read@Address+Prefetch Hint) in FIG. 3. Prefetch hint 304 can include any information that can be provided to MS controller 308, or any information that can be used to generate further information that can be provided to MS controller 308, to facilitate adaptive prefetch decision making. In one example, a compiler can be interfaced between the software 330 and the processor 314 to allow software 330 to provide particular prefetch hints for particular read operations. 404 a thread having a TID is generated by a core of processor 314, and 406 the TID is combined with the RD@Addr+PFH (RD@Addr+TID+PFH) and 408 sent to memory controller 318. In some cases, a TID can be sufficient to facilitate adaptive prefetch decision making in MS controller 108, and as such, prefetch hint 322 can be optional. In one such example, software 330 sends the read request and the associated memory address (RD@Addr) to processor 114, either without prefetch hint 322, or with a prefetch hint that processor 114 excludes from the read request (RD@Addr+TID). The TID, either with or without prefetch hint 322, can be combined or otherwise associated with the read request in a variety of ways. In one example, the prefetch hint 322 and/or the TID (i.e., the adaptive information) are encoded in bits of the read request, which can be additional bits added to the read request, or bits that are not being used by a given memory protocol or standard. Such memory standards can vary, and those skilled in the art can readily identify unused bits for any given standard that can be used. The following are standards for volatile memory; however, such are provided as examples having read request configurations that may apply to NVM, and not for the underlying memory configurations. For synchronous dynamic random-access memory (SDRAM), for example, common standards can include those established by the Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209B for low power DDR (LPDDR) SDRAM, JESD209-2F for LPDDR2 SDRAM, JESD209-3C for LPDDR3 SDRAM, and JESD209-4A for LPDDR4 SDRAM (these standards are available at www.jedec.org; DDR5 SDRAM is forthcoming).

Memory controller 318 receives the read request and decodes the logical address to the physical address of the read data's location in NVM 304 via indirection table 320, and 410 the read request is sent to MS controller 308. MS controller 308 generates read commands from the read request for the referenced read data, which are sent to NVM 304, where the 412 read data is retrieved and sent back to MS controller 308, which in turn sends the read data to processor 314 to fill the read request. MS controller 308 (and/or prefetch engine 310) 414 identifies any prefetch data in NVM 304 from the TID and prefetch hint 332, if present, as described above, for example. If identified, 416 prefetch data is retrieved from NVM 304 and stored in MS cache 306. If prefetch data is not identified in NVM 306, then 418 any prefetch data retrieved with the read data can be dumped.

Figure 5:
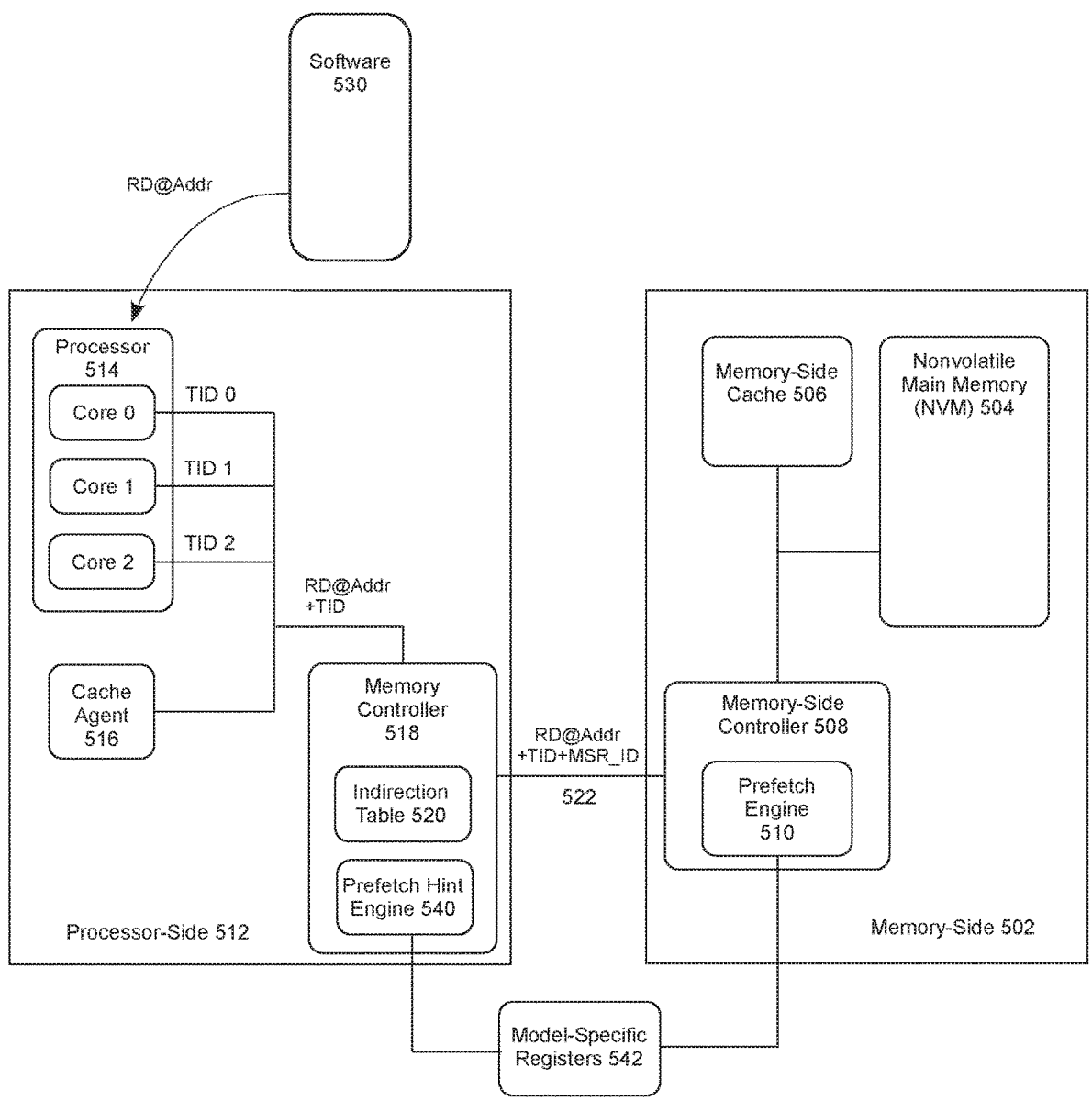
FIG. 5 illustrates a block diagram of a computing system in accordance with an example embodiment.
Figure 6:
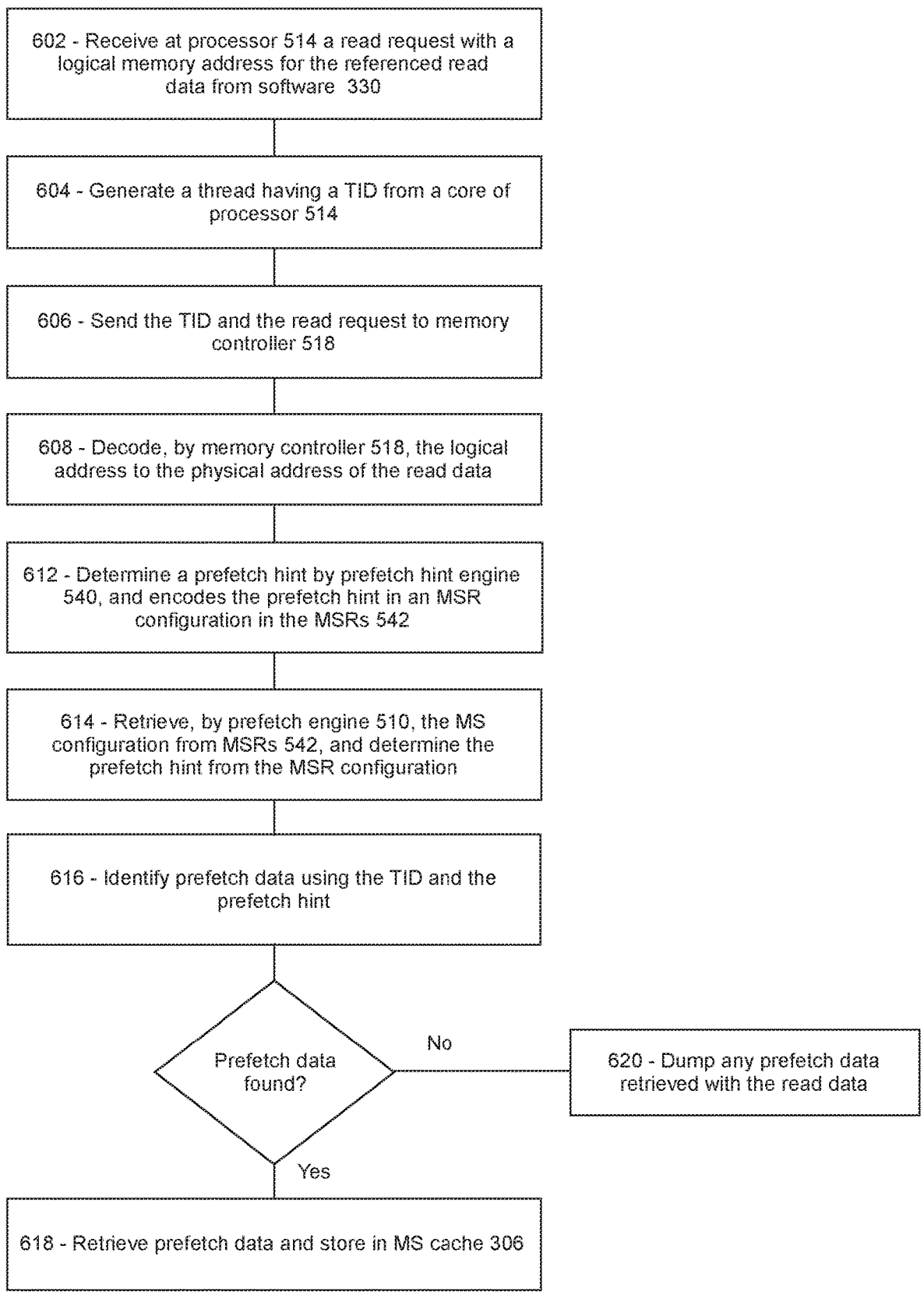
FIG. 6 illustrates steps performed by components of a computing system in accordance with an example embodiment.

In another example, prefetch hints can be implemented using model-specific registers (MSRs). One specific example embodiment of a computing system is shown in FIGS. 5 and 6, and can include MS 502 and PS 512. As similarly described above in FIG. 1A, MS 502 can include NVM 504 communicatively coupled to MS cache 506, which is operable for caching at least prefetch data to improve memory access latency overhead. In addition to prefetch data, MS cache 506 can cache non-prefetched data, such as, for example, read data that has been retrieved to fill a read request, and which may or may not be associated with prefetch data present, or being retrieved into, MS cache 506. MS cache 506 can include any type of memory, including volatile and NVM, that is capable of reducing memory latency access overhead by caching NVM data and prefetch data. In one example, MS cache memory can be volatile memory, described more fully below. MS controller 508 is communicatively coupled to NVM 504 and to MS cache 506, and is configured to at least manage cache operations. MS controller 508 can include prefetch engine 510, which can include hardware circuitry, logic, and the like, to facilitate prefetch decisions and/or prefetch operations, either alone or in combination with MS controller 508. In one example, such decision/operation can include retrieving read data by MS controller 508 from a memory address in NVM 504 to fill a received read request, retrieving prefetch data having an adaptive correlation to the read request, and storing the prefetch data in MS cache 506. It is noted that reference to "MS controller" can refer to the functionality of a prefetch engine, and vice versa, and that reference to either term is considered to include both, unless the context clearly indicates otherwise.

PS 512 can include processor 514, which can be a single processor or multiple processors, including single core processors and multi-core processors. Processor 514 can include any processor type, configuration, or packaging, as described above. FIG. 5 shows processor 514 as having 4 cores (Cores 0-3); however, a processor or processors can include any number of cores, which is not limiting. The processor cores can generate a number of hardware threads, each having a TID. The cores of processor 514 are communicatively coupled to cache agent 516 and to memory controller 518, which can further include indirection table 520. Memory controller 518 can be integrated on chip or on package with processor 514, within an uncore portion of a processor package, or in a structure or component separate from the processor package, such as, for example, an input/output (I/O) hub, Northbridge, or the like. Memory controller 518 is communicatively coupled to MS controller 508 on the MS 502 by interface 522. Additionally, memory controller 518 includes a prefetch hint engine 540, which is communicatively coupled to MSRs 542. From MS 502, prefetch engine 510 is also communicatively coupled to MSRs 542. In one example, software 530 can toggle internal register values via MSRs 542, which can trigger micro-code sequences that have direct access to hardware, such as, for example, manipulating processor 514 states.

In one example implementation, shown in FIG. 6, 602 processor 514 receives a read request with an associated logical memory address for the data referenced by the read request (i.e., read data) from software 530, represented by RD@Addr (Read@Address) in FIG. 5. 604 a thread having a TID is generated by a core of processor 514, and 606 the TID is and the read request (RD@Addr+TID) is sent to memory controller 518. Memory controller 518 receives the read request and the TID, and 608 decodes the logical address to the physical address of the read data's location in NVM 504 via indirection table 520. 610 a prefetch hint is determined by prefetch hint engine 540 from the TID, and is encoded in one or more of the MSRs 542. For example, software 530 can indicate the various priorities of TIDs in MSRs 542. Prefetch hint engine 540 can check MSRs 542 against the TID of every read request reaching MS cache 506, and perform prefetch operations based on the determined priority. In addition to priority, MSRs 542 can convey prefetch hint information pertaining to memory address patterns, ranges of linear addresses, rules for managing MS cache 506, and the like.

MS controller 508 receives the read request from memory controller 518, and generates read commands from the read request for the referenced read data, which are sent to NVM 504. The read data is retrieved and sent back to MS controller 308 to fill the read request. Prefetch engine 510 retrieves the MSR configuration from MSRs 542, and determines the prefetch hint from the MSR configuration. The MS controller 508 (or prefetch engine 540) 616 identifies any prefetch data in NVM 504 from the TID and the prefetch hint, as described above, for example. If identified, 618 prefetch data is retrieved from NVM 504 and stored in MS cache 506. If prefetch data is not identified in NVM 506, then 620 any prefetch data retrieved with the read data can be dumped.

The NVM in the various examples described herein is comprised of NVM that can function as storage memory or main memory. As has been described above, nonlimiting examples of NVM can include planar or three-dimensional (3D) NAND flash memory, including single or multi-threshold-level NAND flash memory, NOR flash memory, single or multi-level Phase Change Memory (PCM), such as chalcogenide glass PCM, planar or 3D PCM, cross-point array memory, including 3D cross-point memory, non-volatile dual in-line memory module (NVDIMM)-based memory, such as flash-based (NVDIMM-F) memory, flash/DRAM-based (NVDIMM-N) memory, persistent memory-based (NVDIMM-P) memory, 3D cross-point-based NVDIMM memory, resistive RAM (ReRAM), including metal-oxide- or oxygen vacancy-based ReRAM, such as $HfO_2$—, $Hf/HfO_x$—, $Ti/HfO_2$—, $TiO_x$—, and $TaO_x$-based ReRAM, filament-based ReRAM, such as $Ag/GeS_2$—, $ZrTe/Al_2O_3$—, and Ag-based ReRAM, programmable metallization cell (PMC) memory, such as conductive-bridging RAM (CBRAM), silicon-oxide-nitride-oxide-silicon (SONOS) memory, ferroelectric RAM (FeRAM), ferroelectric transistor RAM (Fe-TRAM), anti-ferroelectric memory, polymer memory (e.g., ferroelectric polymer memory), magnetoresistive RAM (MRAM), write-in-place non-volatile MRAM (NVMRAM), spin-transfer torque (STT) memory, spin-orbit torque (SOT) memory, nanowire memory, electrically erasable programmable read-only memory (EEPROM), nanotube RAM (NRAM), other memristor- and thyristor-based memory, spintronic magnetic junction-based memory, magnetic tunneling junction (MTJ)-based memory, domain wall (DW)-based memory, and the like, including combinations thereof. The term "memory device" can refer to the die itself and/or to a packaged memory product. NVM can be byte or block addressable. In some examples, NVM can comply with one or more standards promulgated by the Joint Electron Device Engineering Council (JEDEC), such as JESD21-C, JESD218, JESD219, JESD220-1, JESD223B, JESD223-1, or other suitable standard (the JEDEC standards cited herein are available at www.jedec.org). In one specific example, the NVM can be 3D cross-point memory. A memory or memory device can thus include future generation NVM and devices, such as 3D cross-point memory, for example, or other byte addressable write-in-place NVM.

The volatile memory of examples described herein can include any type of volatile memory, and is not considered to be limiting. Volatile memory is a storage medium that requires power to maintain the state of data stored by the medium. Nonlimiting examples of volatile memory can include random access memory (RAM), such as static random-access memory (SRAM), dynamic random-access memory (DRAM), synchronous dynamic random-access memory (SDRAM), and the like, including combinations thereof. SDRAM memory can include any variant thereof, such as single data rate SDRAM (SDR DRAM), double data rate (DDR) SDRAM, including DDR, DDR2, DDR3, DDR4, DDR5, and so on, described collectively as DDRx, and low power DDR (LPDDR) SDRAM, including LPDDR, LPDDR2, LPDDR3, LPDDR4, and so on, described collectively as LPDDRx. In some examples, DRAM complies with a standard promulgated by the Joint Electron Device Engineering Council (JEDEC), such as JESD79F for DDR SDRAM, JESD79-2F for DDR2 SDRAM, JESD79-3F for DDR3 SDRAM, JESD79-4A for DDR4 SDRAM, JESD209B for LPDDR SDRAM, JESD209-2F for LPDDR2 SDRAM, JESD209-3C for LPDDR3 SDRAM, and JESD209-4A for LPDDR4 SDRAM (these standards are available at www.jedec.org; DDR5 SDRAM is forthcoming). Such standards (and similar standards) may be referred to as DDR-based or LPDDR-based standards, and communication interfaces that implement such standards may be referred to as DDR-based or LPDDR-based interfaces. In one specific example, the system memory can be DRAM. In another specific example, the system memory can be DDRx SDRAM. In yet another specific aspect, the system memory can be LPDDRx SDRAM.

Figure 7:
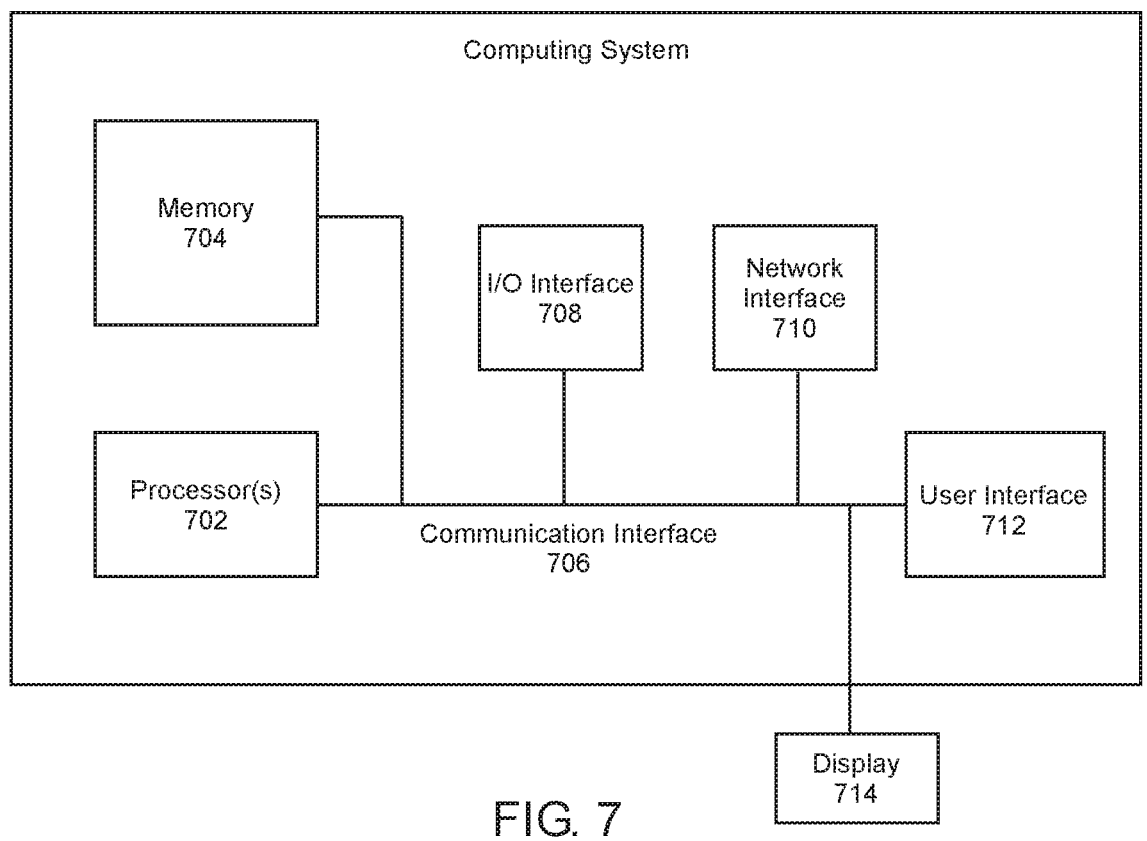
FIG. 7 is a block diagram of a general computing system in accordance with an example embodiment.

As another example, FIG. 7 illustrates a general example of a computing system or device 700 that can incorporate the present technology. While any type or configuration of device or computing system is contemplated to be within the present scope, non-limiting examples can include node computing systems, system-on-chip (SoC) systems, system-in-package (SiP) systems, system-on-package (SoP) systems, server systems, networking systems, high capacity computing systems, laptop computers, tablet computers, desktop computers, smart phones, or the like.

The computing system 700 can include one or more processors 702 in communication with a memory 704. The memory 704 can include any device, combination of devices, circuitry, or the like, that is capable of storing, accessing, organizing, and/or retrieving data. Additionally, a communication interface 706, such as a local communication interface, for example, provides connectivity between the various components of the system. The communication interface 706 can vary widely depending on the processor, chipset, and memory architectures of the system. For example, the communication interface 706 can be a local data bus, command/address bus, package interface, or the like.

The computing system can also include an I/O (input/output) interface 708 for controlling the I/O functions of the system, as well as for I/O connectivity to devices outside of the computing system. A network interface 710 can also be included for network connectivity. The network interface 710 can control network communications both within the system and outside of the system, and can include a wired interface, a wireless interface, a Bluetooth interface, optical interface, communication fabric, and the like, including appropriate combinations thereof. Furthermore, the computing system can additionally include a user interface 712, a display device 714, as well as various other components that would be beneficial for such a system.

The processor 702 can be a single processor or multiple processors, including a single core or multiple processor cores, and the memory can be a single memory or multiple memories. The local communication interface 706 can be used as a pathway to facilitate communication between any of a single processor or processor cores, multiple processors or processor cores, a single memory, multiple memories, the various interfaces, and the like, in any useful combination. In some examples, the communication interface 706 can be a separate interface between the processor 702 and one or more other components of the system, such as, for example, the memory 704. The memory 704 can include system memory that is volatile, nonvolatile, or a combination thereof, as described herein. The memory 704 can additionally include NVM utilized as a memory store.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data.

EXAMPLES

The following examples pertain to specific embodiments and point out specific features, elements, or steps that can be used or otherwise combined in achieving such embodiments.

In one example, there is provided a device, comprising a nonvolatile memory (NVM) configured as main memory, a memory-side (MS) cache communicatively coupled to the NVM and operable to store a cached subset of the NVM, the MS cache including volatile memory, a MS controller communicatively coupled to the NVM and to the MS cache, the MS controller including circuitry configured to, retrieve read data from a memory address in the NVM to fill a read request, check for a correlation between the read request and other data in the NVM, retrieve prefetch data having the correlation with the read request, and store the prefetch data in the MS cache.

In one example of a device, the MS controller circuitry is further configured to discard any prefetch data retrieved with the read data if a correlation is not found.

In one example of a device, the MS controller circuitry further comprises a prefetch engine that, to retrieve the prefetch data having the correlation with the read request, is further configured to, determine a prefetch pattern from received adaptive information, identify the prefetch data from the prefetch pattern, and retrieve the prefetch data from the NVM according to the prefetch pattern.

In one example of a device, the adaptive information comprises a thread identification (TID) of a hardware thread sending the read request.

In one example of a device, the adaptive information further comprises a prefetch hint.

In one example of a device, the prefetch hint includes a function that correlates the prefetch data with the read data, the memory address, or both.

In one example of a device, the prefetch hint includes a priority indicator.

In one example of a device, the prefetch engine is further configured to store at least a portion of the prefetch hint in the MS cache.

In one example of a device, the prefetch engine is further configured to maintain a population of cache lines in the MS cache according to a priority established, at least in part, by the prefetch hint.

In one example of a device, the prefetch engine is further configured to identify a full state of the MS cache, determine that the prefetch data has a higher priority compared to at least a portion of cache lines stored in the MS cache, evict at least a portion of the cache lines having a lower priority than the prefetch data, and store the prefetch data in the MS cache.

In one example of a device, the correlation with the read request includes a correlation with the read data.

In one example of a device, the prefetch hint is retrieved from a model-specific register (MSR) configuration encoded in at least one MSR.

In one example, there is provided a computing system, comprising a processor, a memory controller communicatively coupled to the processor, a nonvolatile memory (NVM) configured as main memory, a memory-side (MS) cache communicatively coupled to the NVM and operable to store a cached subset of the NVM, the MS cache including volatile memory, a MS controller communicatively coupled to the NVM, to the MS cache, and to the memory controller, the MS controller including circuitry configured to, retrieve read data from a memory address in the NVM to fill a read request from the memory controller, check for a correlation between the read request and other data in the NVM, retrieve prefetch data having the correlation with the read request, and store the prefetch data in the MS cache.

In one example of a system, the memory controller comprises circuitry configured to receive the read request from the processor, where the read request includes a thread identification (TID) of a hardware thread sending the read request, and the memory address of the read data, and send the read request to the MS controller.

In one example of a system, the memory controller circuitry is further configured to determine a prefetch hint including the correlation between the read request and the prefetch data, and include the prefetch hint in the read request.

In one example of a system, to determine the prefetch hint, the memory controller circuitry is further configured to receive the prefetch hint from the processor with the read request.

In one example of a system, the processor is configured to receive the prefetch hint from software.

In one example of a system, the memory controller further comprises a prefetch hint engine configured to determine the prefetch hint.

In one example of a system, the prefetch hint engine is further configured to determine the prefetch hint from the TID.

In one example of a system, the prefetch hint engine is further configured to determine the prefetch hint from a model-specific register (MSR) configuration of at least one pre-configured MSR that correlates the prefetch hint with the TID.

In one example of a system, to send the prefetch hint to the MS controller, the prefetch hint engine is further configured to provide the MSR configuration to the MS controller.

In one example of a system, the MS controller circuitry further comprises a prefetch engine that, to retrieve the prefetch data having the correlation with the read request, is further configured to determine a prefetch pattern from received adaptive information, identify the prefetch data from the prefetch pattern, and retrieve the prefetch data from the NVM according to the prefetch pattern.

In one example of a system, the adaptive information comprises a thread identification (TID) of a hardware thread sending the read request.

In one example of a system, the adaptive information further comprises a prefetch hint.

In one example of a system, the prefetch hint includes a function that correlates the prefetch data with the read data, the memory address, or both.

In one example of a system, the prefetch hint includes a priority indicator.

In one example of a system, the prefetch engine is further configured to store at least a portion of the prefetch hint in the MS cache.

In one example of a system, the prefetch engine is further configured to maintain a population of cache lines in the MS cache according to a priority established, at least in part, by the prefetch hint.

In one example of a system, the prefetch engine is further configured to identify a full state of the MS cache, determine that the prefetch data has a higher priority compared to at least a portion of cache lines stored in the MS cache, evict at least a portion of the cache lines having a lower priority than the prefetch data, and store the prefetch data in the MS cache.

In one example of a system, the MS controller circuitry is further configured to discard any prefetch data retrieved with the read data if a correlation is not found.

In one example of a system, the correlation with the read request includes a correlation with the read data.

In one example of a system, the processor includes a plurality of cores.

In one example of a system, the processor is a plurality of processors.

In one example, there is provided a method of adaptively prefetching main system memory data into a memory-side (MS) cache, comprising receiving, from a processor, a read request for read data in a nonvolatile memory (NVM) configured as main memory, where the read request includes a thread identification (TID) of a hardware thread sending the read request, and a memory address of the read data associated with the read request, determining, by a memory controller, a prefetch hint that includes an adaptive correlation between the read request and prefetch data, determining a prefetch pattern in a MS controller from, at least in part, the prefetch hint, retrieving from the NVM, by the MS controller according to the prefetch pattern, the prefetch data having the adaptive correlation to the read request, and storing, by the MS controller, at least a portion of the prefetch data in a MS cache of volatile memory communicatively coupled to the NVM.

In one example of a method, in determining the prefetch hint, the method further comprises receiving, at the memory controller, the prefetch hint from the processor with the read request.

In one example of a method, further comprising determining the prefetch hint within the memory controller.

In one example of a method, further comprising determining the prefetch hint from the TID.

In one example of a method, further comprising determining the prefetch hint from a model-specific register (MSR) configuration from at least one pre-configured MSR that correlates to the prefetch hint.

In one example of a method, further comprising determining, by a prefetch engine of the MS controller, the prefetch pattern by retrieving the MSR configuration from the at least one MSR.

In one example of a method, wherein storing at least a portion of the prefetch data in the MS cache further comprises determining, by a prefetch engine of the MS controller, that the MS cache is full, determining, by the prefetch engine, that the prefetch data has a higher priority compared to at least a portion of cached prefetch data, evicting, by the prefetch engine, a lower priority portion of the cached prefetch data, and storing, by the prefetch engine, the prefetch data in the MS cache.

In one example of a method, wherein determining the prefetch pattern further comprises determining from the prefetch hint not to retrieve prefetch data.

In one example of a method, wherein the prefetch hint indicates no adaptive correlation between the read request and potential prefetch data.

In one example of a method, wherein the prefetch hint indicates an adaptive correlation between the read request and potential prefetch data having a lower priority than cached prefetch data.

In one example of a method, further comprising maintaining, by the MS controller, a population of prefetch cache lines in the MS cache according to a priority established, at least in part, by the prefetch hint.

The invention claimed is:

1. A device, comprising:
    a memory-side (MS) device, further comprising;
        a nonvolatile memory (NVM) configured as system memory;
        a MS cache communicatively coupled to the NVM and operable to store a cached subset of the NVM, the MS cache including volatile memory; and
        a MS controller communicatively coupled to the NVM, to the MS cache, and configured to couple to a memory controller of a processor-side device, the MS controller including MS controller circuitry configured to;
            retrieve read data from a memory address in the NVM to fill a read request from the memory controller;
            check for a correlation between the read request and other data in the NVM;
            retrieve prefetch data having the correlation with the read request; and
            store the prefetch data in the MS cache.

2. The device of claim 1, wherein the MS controller circuitry is further configured to discard any prefetch data retrieved with the read data if a correlation is not found.

3. The device of claim 1, wherein the MS controller circuitry further comprises a prefetch engine that, to retrieve the prefetch data having the correlation with the read request, is further configured to:
    determine a prefetch pattern from received adaptive information;
    identify the prefetch data from the prefetch pattern; and
    retrieve the prefetch data from the NVM according to the prefetch pattern.

4. The device of claim 3, wherein the adaptive information comprises a thread identification (TID) of a hardware thread sending the read request.

5. The device of claim 4, wherein the adaptive information further comprises a prefetch hint.

6. The device of claim 5, wherein the prefetch hint includes a function that correlates the prefetch data with the read data, the memory address, or both.

7. The device of claim 5, wherein the prefetch hint includes a priority indicator.

8. The device of claim 5, wherein the prefetch engine is further configured to store at least a portion of the prefetch hint in the MS cache.

9. The device of claim 8, wherein the prefetch engine is further configured to maintain a population of cache lines in the MS cache according to a priority established, at least in part, by the prefetch hint.

10. The device of claim 5, wherein the prefetch engine is further configured to:
    identify a full state of the MS cache;
    determine that the prefetch data has a higher priority compared to at least a portion of cache lines stored in the MS cache;
    evict at least a portion of the cache lines having a lower priority than the prefetch data; and
    store the prefetch data in the MS cache.

11. The device of claim 1, wherein the correlation with the read request includes a correlation with the read data.

12. The device of claim 5, wherein the prefetch hint is retrieved from a model-specific register (MSR) configuration encoded in at least one MSR.

13. A computing system, comprising:
- a processor-side device, further comprising;
  - a processor; and
  - a memory controller communicatively coupled to the processor;
- a memory-side (MS) device, further comprising:
  - a nonvolatile memory (NVM) configured as system memory;
  - a MS cache communicatively coupled to the NVM and operable to store a cached subset of the NVM, the MS cache including volatile memory; and
  - a MS controller communicatively coupled to the NVM, to the MS cache, and to the memory controller, the MS controller including MS controller circuitry configured to;
    - retrieve read data from a memory address in the NVM to fill a read request from the memory controller;
    - check for a correlation between the read request and other data in the NVM;
    - retrieve prefetch data having the correlation with the read request; and
    - store the prefetch data in the MS cache.

14. The system of claim 13, wherein the memory controller comprises circuitry configured to:
- receive the read request from the processor, where the read request includes:
  - a thread identification (TID) of a hardware thread sending the read request; and
  - the memory address of the read data; and
- send the read request to the MS controller.

15. The system of claim 14, wherein the memory controller circuitry is further configured to:
- determine a prefetch hint including the correlation between the read request and the prefetch data; and
- include the prefetch hint in the read request.

16. The system of claim 15, wherein, to determine the prefetch hint, the memory controller circuitry is further configured to receive the prefetch hint from the processor with the read request.

17. The system of claim 16, wherein the processor is configured to receive the prefetch hint from software.

18. The system of claim 15, wherein the memory controller further comprises a prefetch hint engine configured to determine the prefetch hint.

19. The system of claim 18, wherein the prefetch hint engine is further configured to determine the prefetch hint from the TID.

20. The system of claim 19, wherein the prefetch hint engine is further configured to determine the prefetch hint from a model-specific register (MSR) configuration of at least one pre-configured MSR that correlates the prefetch hint with the TID.

21. The system of claim 20, wherein, to send the prefetch hint to the MS controller, the prefetch hint engine is further configured to provide the MSR configuration to the MS controller.

22. The system of claim 13, wherein the processor includes a plurality of cores.

23. The system of claim 13, wherein the processor is a plurality of processors.

24. A method of adaptively prefetching system memory data into a memory-side (MS) cache, comprising:
- receiving, from a processor, a read request for read data in a nonvolatile memory (NVM) configured as system memory, where the read request includes:
  - a thread identification (TID) of a hardware thread sending the read request; and
  - a memory address of the read data associated with the read request;
- determining, by a memory controller, a prefetch hint that includes an adaptive correlation between the read request and prefetch data;
- determining a prefetch pattern in a MS controller from, at least in part, the prefetch hint;
- retrieving from the NVM, by the MS controller according to the prefetch pattern, the prefetch data having the adaptive correlation to the read request; and
- storing, by the MS controller, at least a portion of the prefetch data in a MS cache of volatile memory communicatively coupled to the NVM.

25. The method of claim 24, wherein, in determining the prefetch hint, the method further comprises receiving, at the memory controller, the prefetch hint from the processor with the read request.

26. The method of claim 24, further comprising determining the prefetch hint within the memory controller.

* * * * *